April 29, 1952  F. H. BUCK ET AL  2,594,863
CRYSTALLIZATION OF SORBITOL
Filed Dec. 24, 1948  2 SHEETS—SHEET 1

FRANK H. BUCK,
MICHAEL M. LUSKIN,
MARSHALL T. SANDERS
INVENTORS.

BY

April 29, 1952 F. H. BUCK ET AL 2,594,863
CRYSTALLIZATION OF SORBITOL
Filed Dec. 24, 1948
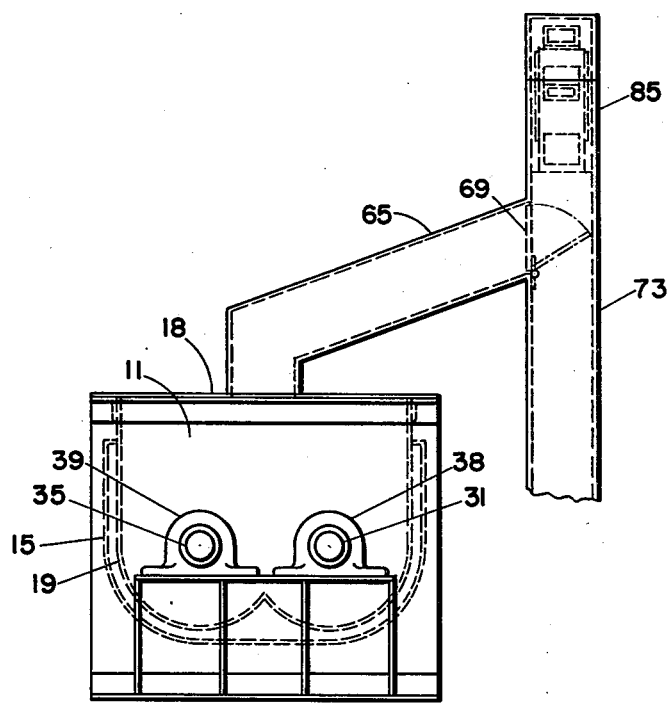
FIG. 3
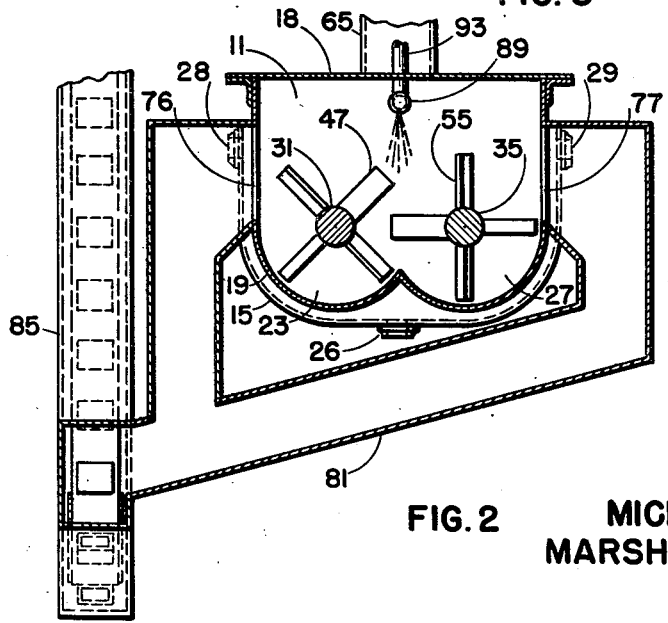
FIG. 2
FRANK H. BUCK,
MICHAEL M. LUSKIN,
MARSHALL T. SANDERS
*INVENTORS*
BY 

Patented Apr. 29, 1952

2,594,863

UNITED STATES PATENT OFFICE 2,594,863

CRYSTALLIZATION OF SORBITOL

Frank H. Buck, Brandywine Hundred, Michael M. Luskin, New Castle Hundred, and Marshall T. Sanders, Brandywine Hundred, Del., assignors to Atlas Powder Company, Wilmington, Del., a corporation of Delaware Application December 24, 1948, Serial No. 67,202

5 Claims. (Cl. 260—637)

The present invention relates to the production of sorbitol.

An object of the invention is the provision of a method for the production of sorbitol in solid form.

Another object of the invention is the provision of a method for making crystalline sorbitol in granular form.

A further object of the invention is the provision of an improved method for the production of a dry crystalline sorbitol.

Still another object of the invention is the provision of an advantageous method for producing dry crystalline sorbitol in granular form directly from a sorbitol melt.

Other objects will be apparent from the following description.

Sorbitol is customarily produced in aqueous solution by the hydrogenation of aqueous solutions of glucose, and it is largely marketed in solution form. For many purposes, however, it is desirable that sorbitol be in dry granular form.

Processes have been developed for growing crystals of sorbitol in solution and either separating such crystals from their mother liquor for drying, or drying the magma of crystals and mother liquor in such manner that the remainder of the sorbitol crystallizes as the solvent evaporates. However, such procedures are expensive and time consuming, involving difficultly controlled procedures or the use of expensive equipment.

Direct production of granular sorbitol from molten sorbitol such as may be obtained by evaporating an aqueous solution thereof to virtual dryness has not heretofore been found practical because of the hygroscopic nature of sorbitol, and because of its tendency on cooling from a melt to set up as a body into a hard glassy condition.

In accordance with the present invention granular sorbitol may be produced from molten sorbitol if the molten material is mixed with preformed grains of crystalline sorbitol, and the mixture is further mixed with preformed dry grains of crystalline sorbitol while heat of crystallization is abstracted from the mixture.

Desirably the performance of these steps may be carried out by feeding preformed granular crystalline sorbitol and molten sorbitol into an elongated heat exchanging zone containing preformed grains of crystalline, granular sorbitol and agitating and mixing means, such as paddles, which forcibly mix the granules, rubbing them one against another while propelling them through the zone.

The process of the invention lends itself admirably to continuous operation in which granular sorbitol is recycled through an elongated heat exchanging and mixing zone while molten sorbitol is added at the beginning of said zone and granular sorbitol is removed continuously or in increments from a point in the cycle outside of the cooling and mixing zone. The invention will be further described in terms of one device for conducting such a continuous process and in connection with the drawings in which:

Figure 2 is a sectional end view of the apparatus of Figure 1 taken on line 2—2 of Figure 1, and Figure 3 is an end view taken from the left end of Figure 1.

Figure 1:
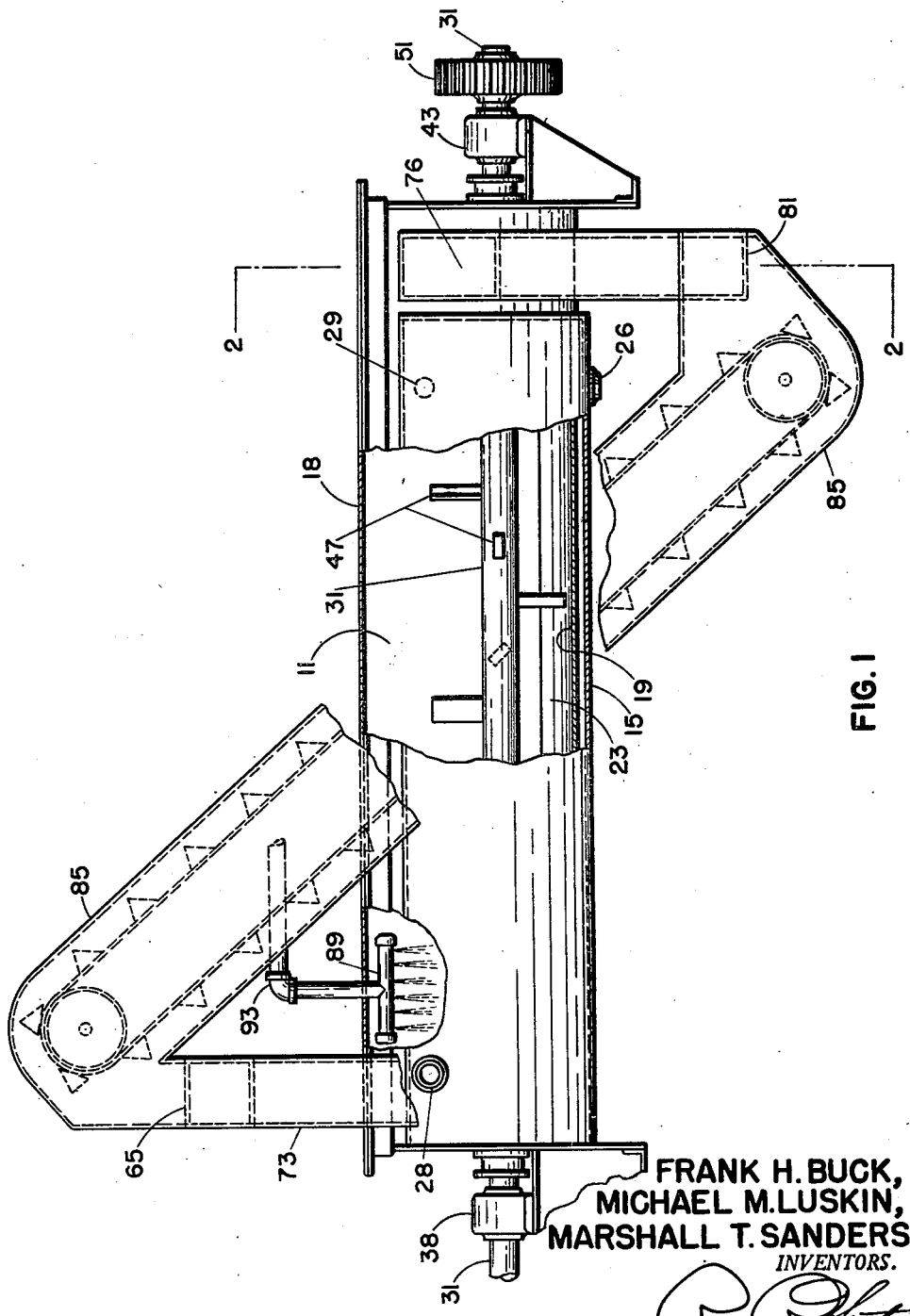
Figure 1 is a diagrammatic longitudinal view, partly in section, of an apparatus for performing the invention.

Referring to the figures in detail, 11 designates generally an elongated jacketed mixer including outside shell 15 and inside shell 19, and fitted with a removable cover 18. The bottom of inside shell 19 is divided into two arcuate portions 23 and 27. A series of ports, one of which is shown as 28, provide ingress for heat exchange fluid to the jacket formed by shells 15 and 19. The said fluid leaves the jacket through a similar series of ports, one of which is shown as 29, on the opposite side of the mixer. A bottom outlet in the jacket for draining may be provided at 26.

Shafts 31 and 35 extend longitudinally in side-by-side relationship through mixer 11. Shaft 31 is journaled in bearings 38 and 43 and is provided with paddles along its length. The paddles generally designated by 47 are adjustable in pitch and are so adjusted as to provide both a mixing and propulsive action (from left to right in the apparatus shown in Figure 1). Shaft 31 is provided on one end with gear wheel 51. Shaft 35 (see Figures 2 and 3) is provided with paddles 55, and bearings, one of which is shown as 39, and a gear (not shown) similar to those provided for shaft 31. The gears mesh so that turning of shaft 31 makes shaft 31 turn in the opposite direction. Shaft 31 may be driven by any suitable means (not shown).

Conveyer 85 elevates granular sorbitol from the discharge end of mixer 11, whence it may be either recycled to the mixer by means of chute 65 or removed from the system to storage by means of chute 73 depending upon the setting of the movable vane 69. Granular sorbitol is discharged from mixer 11 through ports 76 and 77 from which it falls into duct 81 and is delivered to the base of the elevating conveyer 85.

Spray head 89, through which molten sorbitol is introduced into the apparatus is mounted above the center line of the elongated mixer, just down stream from the point at which preformed granular crystalline sorbitol enters through duct 65. Molten sorbitol is conducted to the spray head 89 through pipe 93 from a source not shown.

In operation the apparatus is partially filled with crystalline sorbitol in granular form. Then, with shafts 31 and 35 being driven slowly so that paddles 47 and 55 thoroughly mix the contents of mixer 11 and slowly propel them toward exit ports 76 and 77, preformed granular sorbitol is fed to mixer 11 through duct 65, and molten sorbitol is sprayed onto the agitated granular sorbitol. Meanwhile, the apparatus is maintained at a proper crystallization temperature by means of heat exchange fluid flowing through the jacket formed by shells 15 and 19.

The granular sorbitol produced in the process together with that originally present passes out the exit ports 76 and 77 into duct 81 and from thence to conveyor 85 by means of which it is fed back to the apparatus through duct 65 or directed to product storage through chute 73 depending upon the position selected for vane 69. Vane 69 is turned to recycle the granular sorbitol until the amount of material in the mixer builds up to a predetermined extent. Then vane 69 is turned to direct the granular sorbitol to product storage until the excess is taken off, after which it is returned to recycle position. Of course, means may be provided so that granular sorbitol may be drawn off continuously at a rate equal to that at which molten sorbitol enters the mixer, but the arrangement shown has been found satisfactory.

The molten sorbitol admitted to the apparatus, being viscous, heavily coats the top layer of granules of crystalline sorbitol which it first contacts. Then the mixing and propulsion caused by the paddles makes the coated granules rub against fresh uncoated granules, and the molten sorbitol is spread into a very thin film, in contact with crystalline sorbitol on both sides of the film and subjected to mechanical working. These conditions favor rapid crystallization of the molten film. Simultaneously a sufficient number of projecting irregularities and parasite crystals are broken from the granules to form nuclei for new grains. Unexpectedly, a disproportionate share of the sorbitol melt seems to adhere to such smaller irregularly shaped grains rather than to larger, smooth granules or pellets, and there is little tendency for the average particle size to increase even after long continued operation.

The sequence of steps involved in the process of the invention may be summarized as follows. In a first zone of the apparatus, immediately under spray head 89, preliminary mixing of molten and granular sorbitol and the coating of some of the granular sorbitol with molten sorbitol takes place. In the central portion of the elongated mixer, mixing and rubbing of coated material with uncoated granular sorbitol occurs. In the third zone, toward the exit ports 76 and 77, occurs final crystallization and formation of the new solid sorbitol. These zones are not, it will be appreciated, clearly defined, but they indicate generally the course of the process of the invention. For example, some crystallization may occur in the first, and undoubtedly occurs in the second zone since the solids in the mixer are at all times below the melting point of sorbitol. However, by the arrangement described, any thick films of viscous, super-cooled sorbitol melt through which crystallization would proceed very slowly are removed from the zone in which more liquid phase is added and are rubbed and tumbled against uncoated granules whereby the films are thinned down and thoroughly subjected to the seeding action of the crystalline material in the preformed granules. The rate of addition of molten sorbitol relative to the rate and amount of granular material being recycled is kept sufficiently low that the formation of a matrix about the granules is avoided. Crystallization is thus hastened and by the time a given portion of the circulating material has completed its cycle the surface layer has crystallized to such an extent that it can serve as seed to induce crystallization in a fresh film of molten sorbitol.

The following example illustrates a specific embodiment of the process of the invention.

*Example*

A mixer of the type described and having about 100 paddles regularly spaced through about 13½ feet of mixing length was operated with a base load of about 3,000 lbs. of granular sorbitol. Molten sorbitol which had been evaporated so that it had a water content of about 0.5% was fed into the apparatus at a temperature of 220° F. and at a rate of 360 pounds per hour. The temperature of the heat exchange fluid in the jacket was regulated to keep the mass of material in the mixer at about 180° F. The shafts were turned at a rate of 6 R. P. M. and the paddles were adjusted so that 9,600 pounds per hour of material left the apparatus. All of the material leaving the apparatus was either recycled or passed to storage in a repeated cycle of 40 minutes during which all material was recirculated and 1.6 minutes during which all material was sent to product storage. The bulk of the granular sorbitol emerging from the apparatus (and hence the granular material being recycled) had a grain size ranging from about ⅛ inch to about ⅜ inch in diameter.

As has been mentioned above, the process of the invention is particularly valuable because it provides a means of forming a granular product from molten sorbitol. It is not meant to imply, however, that the sorbitol used must be absolutely dry, for the process may be satisfactorily applied to sorbitol having water contents up to about 2%. As the water content exceeds this value, however, the process becomes less practical, for the product becomes progressively stickier and more difficult to handle.

The temperature at which the body of material being mixed is maintained can be varied. Too low a temperature, below about 120° F., retards the rate of crystallization in the film of molten sorbitol, probably because of the resultant high viscosity thereof. It is necessary, however, that the temperature of the grains be sufficiently low to cool the molten sorbitol to a temperature below its melting point. The preferred range is between about 160° F. and about 195° F.

The desirability of spreading the molten sorbitol in a thin film over and between granules of crystalline sorbitol in the mixer and of avoiding the formation of a matrix have been pointed out, and in order to supply a sufficient surface area of granules it is desirable that the ratio of recycled solid phase to feed of molten sorbitol be greater than about 10 to 1 and preferably be maintained at above about 15 to 1. At lower ratios inordinately long times for complete crystallization of the melt may be encountered. Higher ratios may be utilized although there seems to be no practical advantage in recirculating more than about 30 pounds of solid for each pound of feed introduced.

The length of time between successive coatings of a granule with molten sorbitol is controlled by the ratio of weight recycled per unit time to the weight of granular sorbitol in the system. Desirably, a residence time in the mixer of at least 10 minutes is allowed which is achieved by recycling a maximum of 6 pounds per hour for each pound of granular sorbitol in process. Preferably a time of at least 15 minutes is allowed which may be achieved by maintaining the ratio of pounds recycled per hour to pounds in process at a maximum value of 4. Longer residence times, achieved by decreasing this ratio, are in no wise detrimental to the process except as they limit the amount of product produced in a mixer of given holding capacity by virtue of limitation on the ratio of recycled material to feed of molten sorbitol disclosed above.

In terms of the just discussed ratios the example cited above was operated at a ratio of recycled granular sorbitol to feed of 26.7 and at a ratio of recycled material per hour to material in process of 3.2.

The temperature of the molten sorbitol fed to the mixer must be above about 198° F. to avoid risk of freezing and congealing in the lines and is expediently maintained below about 230° F. to avert risk of developing odor and color by thermal degradation.

What is claimed is:

1. A process for preparing granular crystalline sorbitol which comprises advancing a body of preformed granules of crystalline sorbitol through an elongated zone in which the granules are forcibly mixed and rubbed one against another; adding molten sorbitol containing not more than about 2 percent water to the forepart of said elongated zone; distributing said molten sorbitol over said granules in said forepart and in a subsequent part of said elongated zone by said forcible mixing and rubbing action among the granules; the rate of addition of molten sorbitol to said elongated zone being insufficient to provide a matrix about said granules after mixing; discharging granular crystalline sorbitol from the after end of the elongated zone after the added molten sorbitol has substantially crystallized; and maintaining the temperature in the said elongated zone above about 120° F. and below the melting point of sorbitol.

2. A process as described in claim 1 in which the weight of granular crystalline sorbitol entering the said elongated zone per unit time is at least ten times the weight of said molten sorbitol added per unit time.

3. A process as described in claim 1 in which the temperature of the material in the said elongated zone is maintained between about 160° F. and about 195° F.

4. A process as described in claim 1 in which the residence time of the mixture of granular crystalline sorbitol and molten sorbitol in the said elongated zone is at least 10 minutes.

5. A process for preparing granular crystalline sorbitol which comprises continuously advancing a body of preformed granules of crystalline sorbitol in a cycle which includes an elongated zone, the rate of advance being such that the residence time in the said elongated zone is at least 10 minutes; intimately mixing and rubbing the granules one against another in said elongated zone; adding molten sorbitol containing not more than about 2 percent water at the beginning of said elongated zone at a rate in terms of weight per unit time not to exceed one tenth of the rate at which the said body of granular sorbitol enters the elongated zone; withdrawing crystalline sorbitol from a point outside of said elongated zone; and maintaining the material in the elongated zone at a temperature between about 160° F. and about 185° F.

FRANK H. BUCK.
MICHAEL M. LUSKIN.
MARSHALL T. SANDERS.

REFERENCES CITED

The following references are of record in the file of this patent:

UNITED STATES PATENTS

| Number | Name | Date |
| --- | --- | --- |
| 2,091,900 | Widmer | Aug. 31, 1937 |
| 2,315,699 | Goepp | Apr. 6, 1943 |
| 2,347,288 | Schlegel et al. | Apr. 25, 1944 |